US012598602B2

(12) United States Patent
He et al.

(10) Patent No.: US 12,598,602 B2
(45) Date of Patent: Apr. 7, 2026

(54) DETERMINING PROCESSING TIME FOR HIGH FREQUENCY RANGE

(71) Applicant: Apple Inc., Cupertino, CA (US)

(72) Inventors: Hong He, San Jose, CA (US); Dawei Zhang, Saratoga, CA (US); Oghenekome Oteri, San Diego, CA (US); Chunxuan Ye, San Diego, CA (US); Seyed Ali Akbar Fakoorian, San Diego, CA (US); Chunhai Yao, Beijing (CN); Yushu Zhang, Beijing (CN); Wei Zeng, Saratoga, CA (US); Sigen Ye, Whitehouse Station, NJ (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/440,615

(22) PCT Filed: Jan. 14, 2021

(86) PCT No.: PCT/CN2021/071764
§ 371 (c)(1),
(2) Date: Sep. 17, 2021

(87) PCT Pub. No.: WO2022/151152
PCT Pub. Date: Jul. 21, 2022

(65) Prior Publication Data
US 2023/0362914 A1    Nov. 9, 2023

(51) Int. Cl.
*H04W 4/00* (2018.01)
*H04W 72/1263* (2023.01)
*H04W 72/51* (2023.01)

(52) U.S. Cl.
CPC ....... *H04W 72/1263* (2013.01); *H04W 72/51* (2023.01)

(58) Field of Classification Search
CPC ..... H04W 72/51; H04W 72/04; H04W 72/12; H04W 72/50; H04W 72/1263; H04W 72/0446; H04J 2203/0069
See application file for complete search history.

(56) References Cited

U.S. PATENT DOCUMENTS

| | | | | |
|---|---|---|---|---|
| 7,949,063 B2 * | 5/2011 | Jonsson | ............... | H04B 1/7103 |
| | | | | 375/267 |
| 2004/0093548 A1 * | 5/2004 | Heo | ...................... | H04L 1/1812 |
| | | | | 714/749 |

(Continued)

FOREIGN PATENT DOCUMENTS

| | | |
|---|---|---|
| WO | WO 2020/143529 A1 | 7/2020 |
| WO | WO 2020/194162 A1 | 10/2020 |

OTHER PUBLICATIONS

International Search Report and Written Opinion of the International Searching Authority directed to related International Patent Application No. PCT/CN2021/071764, mailed Sep. 28, 2021; 8 pages.

(Continued)

*Primary Examiner* — Shantell L Heiber
(74) *Attorney, Agent, or Firm* — STERNE, KESSLER, GOLDSTEIN & FOX P.L.L.C.

(57) ABSTRACT

Some embodiments include an apparatus, method, and computer program product for facilitating processing times in a 5G wireless communications system. When operating at higher frequency subcarrier spacing (SCS), slot times for receiving and/or transmitting data between user equipment (UE) and a 5G Node B (gNB) become shorter. Because of this, some UE may face difficulty in processing physical downlink shared channel (PDSCH), physical uplink shared channel (PUSCH), and/or physical downlink control channel (PDCCH) data with sufficient speed. To address potential limitations, a flexible minimum processing time may be (Continued)

500A used to accommodate different UE processing capabilities. The UE may report its processing capabilities to the gNB. The gNB may then schedule communications according to the UE's processing capabilities. The gNB may consider whether the UE implements a single or multiple processing engines. Further, the gNB may apply single-slot and/or multi-slot scheduling techniques to also prevent timing issues.

17 Claims, 14 Drawing Sheets

(56)            References Cited

U.S. PATENT DOCUMENTS

| | | | | |
|---|---|---|---|---|
| 2009/0103488 A1* | 4/2009 | Zhu | ....................... | H04W 52/26 |
| | | | | 370/329 |
| 2018/0242319 A1* | 8/2018 | Akkarakaran | .... | H04W 52/0219 |
| 2019/0007960 A1* | 1/2019 | Fu | ......................... | H04W 72/23 |
| 2020/0022175 A1* | 1/2020 | Xiong | ..................... | H04L 5/001 |
| 2020/0137588 A1 | 4/2020 | Zhang et al. | | |
| 2020/0178276 A1* | 6/2020 | Feng | ................. | H04W 72/1268 |
| 2020/0236635 A1* | 7/2020 | Yan | ........................... | H04L 5/14 |
| 2020/0267752 A1* | 8/2020 | Mukherjee | ........ | H04W 28/0278 |
| 2022/0278787 A1* | 9/2022 | Liu | ....................... | H04L 5/0023 |

OTHER PUBLICATIONS

Huawei, et al., "Considerations on UL scheduling/HARQ issues," R1-1907551, 3GPP TSG RAN WG1 Meeting #97, Reno, USA, May 17, 2019; 7 pages.
Vivo, "UL inter-UE Tx prioritization for URLLC," R1-2001673, 3GPP TSG RAN WG1 #100bis, e-Meeting, Apr. 30, 2020; 12 pages.
International Preliminary Report on Patentability directed to International Patent Application No. PCT/CN2021/071764, issued Jul. 27, 2023; 5 pages.

* cited by examiner

310

1 radio frame = 10 subframes = 10 slots = 10 ms

315

Subcarrier Spacing = 15kHz 1 subframe = 1 slot = 1 ms

320

1 slot = 14 symbols = 1 ms 1 radio frame = 10 subframes = 20 slots = 10 ms

325

Subcarrier Spacing = 30kHz 1 subframe = 2 slots = 1 ms

330

1 slot = 14 symbols = 0.5 ms

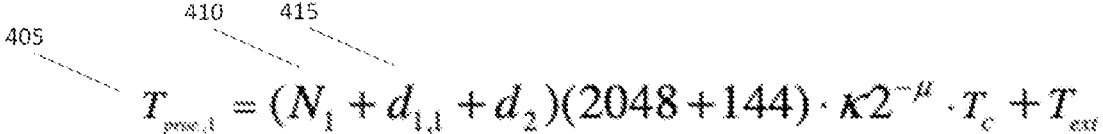

$$T_{proc,1} = (N_1 + d_{1,1} + d_2)(2048 + 144) \cdot \kappa 2^{-\mu} \cdot T_c + T_{ext}$$

PDSCH processing time for PDSCH processing capability 1

| $\mu$ | PDSCH decoding time $N_1$ [symbols] | |
|---|---|---|
| | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

PDSCH processing time for PDSCH processing capability 2

| $\mu$ | PDSCH decoding time $N_1$ [symbols] |
|---|---|
| | dmrs-AdditionalPosition = pos0 in DMRS-DownlinkConfig in both of dmrs-DownlinkForPDSCH-MappingTypeA, dmrs-DownlinkForPDSCH-MappingTypeB |
| 0 | 3 |
| 1 | 4.5 |
| 2 | 9 for frequency range 1 |

FIG. 4A

$$T_{proc,2} = \max\left((N_2 + d_{2,1} + d_2)(2048 + 144) \cdot \kappa 2^{-\mu} \cdot T_c + T_{ext} + T_{switch}, d_{2,2}\right)$$

PUSCH preparation time for PUSCH timing capability 1

| $\mu$ | PUSCH preparation time $N_2$ [symbols] |
|---|---|
| 0 | 10 |
| 1 | 12 |
| 2 | 23 |
| 3 | 36 |

PUSCH preparation time for PUSCH timing capability 2

| $\mu$ | PUSCH preparation time $N_2$ [symbols] |
|---|---|
| 0 | 5 |
| 1 | 5.5 |
| 2 | 11 for frequency range 1 |

470

CSI computation delay requirement 1

| $\mu$ | $Z_1$ [symbols] | |
|---|---|---|
| | $Z_1$ | $Z'_1$ |
| 0 | 10 | 8 |
| 1 | 13 | 11 |
| 2 | 25 | 21 |
| 3 | 43 | 36 |

480

CSI computation delay requirement 2

| $\mu$ | $Z_1$ [symbols] | | $Z_2$ [symbols] | | $Z_3$ [symbols] | |
|---|---|---|---|---|---|---|
| | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\min(44, X_2 + KB_1)$ | $X_2$ |
| 3 | 97 | 85 | 152 | 140 | $\min(97, X_3 + KB_2)$ | $X_3$ |

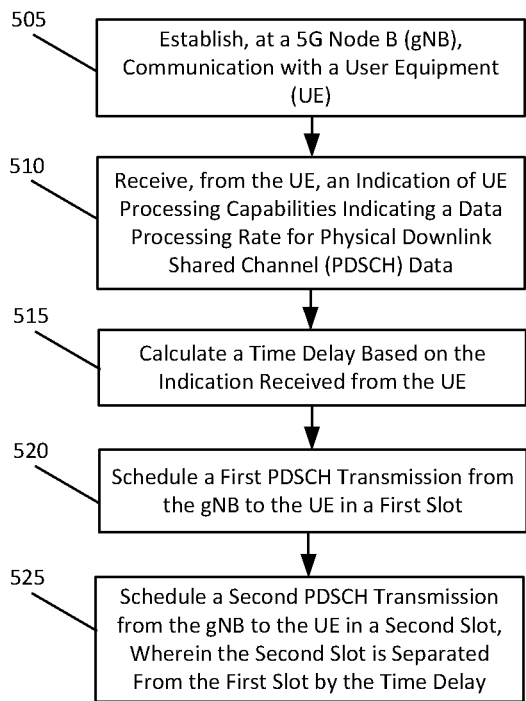

505 — Establish, at a 5G Node B (gNB), Communication with a User Equipment (UE)

510 — Receive, from the UE, an Indication of UE Processing Capabilities Indicating a Data Processing Rate for Physical Downlink Shared Channel (PDSCH) Data 515 — Calculate a Time Delay Based on the Indication Received from the UE 520 — Schedule a First PDSCH Transmission from the gNB to the UE in a First Slot 525 — Schedule a Second PDSCH Transmission from the gNB to the UE in a Second Slot, Wherein the Second Slot is Separated From the First Slot by the Time Delay

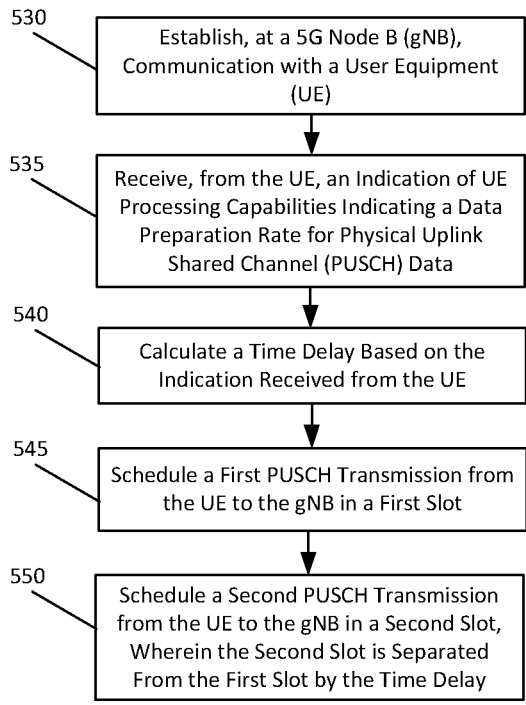

530 — Establish, at a 5G Node B (gNB), Communication with a User Equipment (UE)

535 — Receive, from the UE, an Indication of UE Processing Capabilities Indicating a Data Preparation Rate for Physical Uplink Shared Channel (PUSCH) Data 540 — Calculate a Time Delay Based on the Indication Received from the UE 545 — Schedule a First PUSCH Transmission from the UE to the gNB in a First Slot 550 — Schedule a Second PUSCH Transmission from the UE to the gNB in a Second Slot, Wherein the Second Slot is Separated From the First Slot by the Time Delay

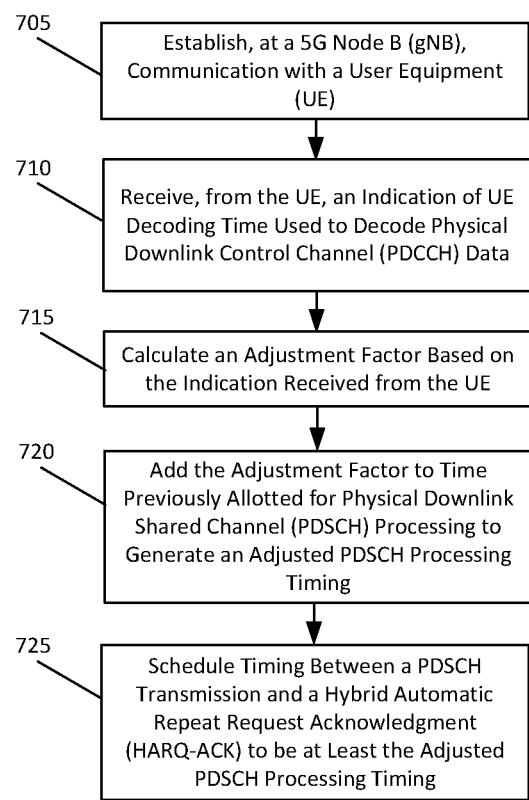

705

Establish, at a 5G Node B (gNB), Communication with a User Equipment (UE)

710

Receive, from the UE, an Indication of UE Decoding Time Used to Decode Physical Downlink Control Channel (PDCCH) Data

715

Calculate an Adjustment Factor Based on the Indication Received from the UE

720

Add the Adjustment Factor to Time Previously Allotted for Physical Downlink Shared Channel (PDSCH) Processing to Generate an Adjusted PDSCH Processing Timing

725

Schedule Timing Between a PDSCH Transmission and a Hybrid Automatic Repeat Request Acknowledgment (HARQ-ACK) to be at Least the Adjusted PDSCH Processing Timing

FIG. 7

DETERMINING PROCESSING TIME FOR HIGH FREQUENCY RANGE

CROSS REFERENCE TO RELATED PATENT APPLICATIONS

This application is a U.S. National Phase of International Application No. PCT/CN2021/071764, filed Jan. 14, 2021, which is hereby incorporated by reference in its entirety.

BACKGROUND

Various embodiments generally may relate to the field of wireless communications.

SUMMARY

Some embodiments of this disclosure include apparatuses and methods for adjusting physical downlink shared channel (PDSCH) and/or physical uplink shared channel (PUSCH) communications at high frequencies based on user equipment (UE) capabilities and/or processing times.

In some embodiments, a wireless communication apparatus may facilitate scheduling PDSCH and/or PUSCH communications based on UE capability. The wireless communication apparatus may comprise a transceiver and at least one processor coupled to the transceiver. The at least one processor may be configured to establish 5G communication with a user equipment (UE). The at least one processor may be configured to receive, from the UE, an indication of UE processing capabilities indicating a data processing rate for physical data channel communications. The at least one processor may be configured to calculate a time delay based on the indication received from the UE. The at least one processor may be configured to schedule a first physical data channel communication in a first slot and schedule a second physical data channel communication in a second slot, wherein the second slot is separated from the first slot by the time delay.

In some embodiments, the physical data channel communications are physical downlink shared channel (PDSCH) transmissions from the transceiver to the UE or physical uplink shared channel (PUSCH) transmissions from the UE to the transceiver.

In some embodiments, the communication may occur using a subcarrier spacing (SCS) of 480 kHz or 960 KHz.

In some embodiments, the indication may include a number of physical data channel communications that the UE is able to process per number of slots.

In some embodiments, the indication may include a number of physical data channel communications that the UE is able to process in parallel.

In some embodiments, the indication may include a sum data rate that the UE is able to process within a time window.

In some embodiments, the indication may include a span pattern indicating a number of physical data channel communications that the UE is able to process within a span duration.

In some embodiments, a method for scheduling PDSCH communications may include establishing, at a 5G Node B (gNB), communication with a user equipment (UE). The method may include receiving, from the UE, an indication of UE decoding time used to decode physical downlink control channel (PDCCH) data. The method may include calculating an adjustment factor based on the indication received from the UE. The method may include adding the adjustment factor to time previously allotted for physical downlink shared channel (PDSCH) processing to generate an adjusted PDSCH processing timing and scheduling timing between a PDSCH transmission and a hybrid automatic repeat request acknowledgment (HARQ-ACK) to be at least the adjusted PDSCH processing timing.

In some embodiments, the method may further include the adjustment factor being a fixed adjustment factor applied to the PDSCH transmission.

In some embodiments, the method may further include the adjustment factor being a variable adjustment factor determined using a duration of a PSDSCH transmission and a scaling factor dependent on PDCCH decoding time.

In some embodiments, the method may further include applying a first adjustment factor to a first PDSCH transmission and applying a second adjustment factor to a second PDSCH transmission following the first PDSCH transmission, wherein the second adjustment factor is less than the first adjustment factor.

In some embodiments, the method may further include grouping a first PDSCH transmission with a third PDSCH transmission and applying a first group adjustment factor to the first PDSCH transmission and the third PDSCH transmission. The method may further include grouping a second PDSCH transmission with a fourth PDSCH transmission and applying a second group adjustment factor to the second PDSCH transmission and the fourth PDSCH transmission.

In some embodiments, the method may further include the scheduling occurring via cross-slot scheduling.

In some embodiments, the method may further include the scheduling occurring via multi-slot scheduling.

In some embodiments, a method for scheduling PDSCH communications may include establishing, at a 5G Node B (gNB), communication with a user equipment (UE). The method may include receiving, from the UE, an indication of UE processing capabilities The method may further include scheduling, at the gNB, physical downlink shared channel (PDSCH) communications with the UE according to the indication of the UE processing capabilities.

In some embodiments, the method may further include the indication indicating that the UE does not support same-slot scheduling and supports cross-slot scheduling. The method may further include the PDSCH communications being scheduled using cross-slot scheduling.

In some embodiments, the method may further include the indication indicating that the UE does not support same-slot scheduling and supports cross-slot scheduling. The method may further include scheduling, at the gNB, physical uplink shared channel (PUSCH) communications with the UE using cross-slot scheduling.

In some embodiments, the method may further include the PDSCH communication occurring using a subcarrier spacing (SCS) of 480 kHz or 960 kHz.

In some embodiments, the method may further include the scheduling further comprising adding a minimum timing offset to the PDSCH communications.

In some embodiments, the method may further include the indication of UE processing capabilities being used to derive the minimum timing offset.

BRIEF DESCRIPTION OF THE DRAWINGS/FIGURES

FIG. 4A illustrates a block diagram of PDSCH processing times, according to some embodiments.

FIG. 4C illustrates a block diagram of CSI computation delay times, according to some embodiments.

FIG. 5A illustrates a flowchart for PDSCH scheduling based on user equipment (UE) PDSCH processing capability reporting, according to some embodiments.

FIG. 5B illustrates a flowchart for PUSCH scheduling based on user equipment (UE) PUSCH preparation capability reporting, according to some embodiments.

FIG. 7 illustrates a flowchart for UE processing time adjustments based on physical downlink control channel (PDCCH) decoding when determining PDSCH processing time, according to some embodiments.

Figure 1:
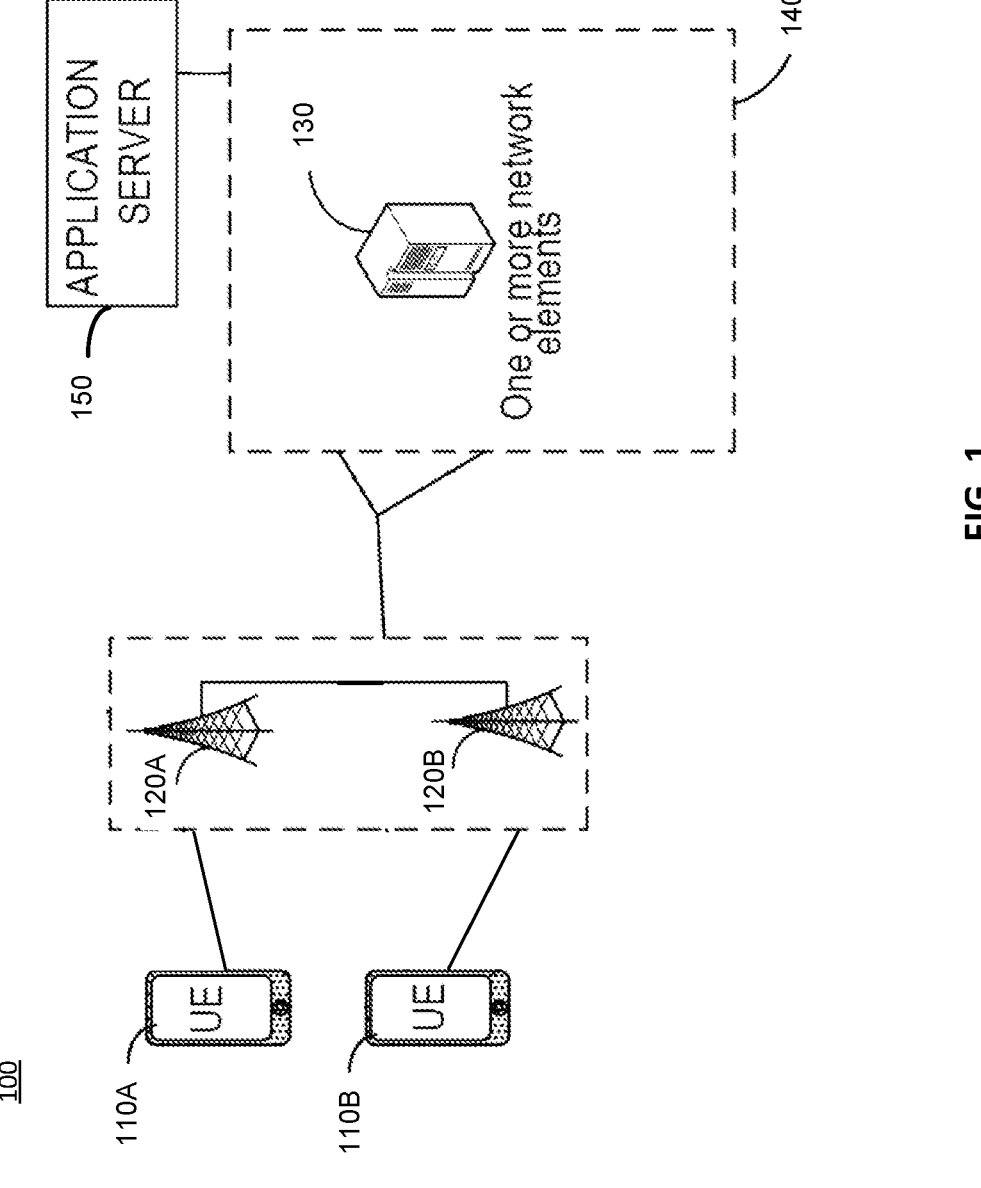
FIG. 1 illustrates an example system implementing flexible processing time adjustments for physical downlink shared channel (PDSCH) and/or physical uplink shared channel (PUSCH) communications, according to some embodiments.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

This disclosure relates to user equipment (UE) communications using the 5G wireless communications protocol. As part of the development of the 5G standard, 3rd Generation Partnership Project (3GPP) has released several documents detailing the meetings notes and developments. Two such documents are known as Release 15 (Rel-15) and Release 16 (Rel-16).

As developments continue with subsequent releases of the 5G standard, one change may be an increase of the frequency for subcarrier spacing (SCS). For example, SCS frequencies may operate at higher frequencies, such as 480 kHz, 960 KHZ, or beyond. When operating with this higher frequency SCS, however, the time allotted for receiving and/or transmitting data between user equipment (UE) and a 5G Node B (gNB) may become shorter despite transmitting the same number of symbols. For example, slot times for this communication may become shorter despite being required to process and/or prepare the same number of symbols. In view of this shortened length of time, some UE may face difficulty in processing data with sufficient speed. This may be due to, for example, hardware limitations of a UE. In this manner, UE may face difficulty processing received physical downlink shared channel (PDSCH) data with sufficient speed. Similarly, UE may also face difficulty preparing data with sufficient speed to transmit on a physical uplink shared channel (PUSCH) based on the scheduling allotted at a gNB. Further, decoding data received over a physical downlink control channel (PDCCH) may also add non-negligible time to processing at the UE. For example, at lower frequency SCS, this processing time may be negligible, but at higher frequency SCS, this PDCCH decoding time may one or more slots of processing time at the UE.

To account for and address potential UE limitations or different UE capabilities, some embodiments provide a flexible minimum processing time, which may be used to accommodate different processing capabilities of different UE. In some embodiments, 5G networks and/or gNBs may schedule PDSCH and/or PUSCH communications to allow UEs sufficient time to process received communications and/or prepare communications for transmissions. This scheduling may account for the slots of time used by the UE to preform PDSCH processing, PUSCH preparation, and/or PDCCH decoding.

For example, in some embodiments, gNBs may allow the UE to support cross-slot scheduling in RRC connected states. For example, cross-slot scheduling may be used when the SCS is 480 kHz or 960 KHZ. This may occur when the UE reports to the gNB that the UE does not support same-slot scheduling but supports cross-slot scheduling. For example, the UE may only support cross-slot scheduling. In this case, if PDCCH decoding uses one or more slots, the communication may avoid issues with same-slot scheduling and avoid unnecessary buffering of received PDSCH data while the UE is still decoding PDCCH data. In this manner, the gNB may schedule PDSCH and/or PUSCH communications using cross-slot scheduling.

In some embodiments, gNBs may also use a minimum offset in units of slots to provide this timing. For example, a minimum offset of slots may be added to signal timing for PDSCH communication schedules. Similarly, this offset of slots may also be used for PUSCH scheduling times, aperiodic channel status information (CSI) report times, and/or PDSCH to hybrid automatic repeat request-acknowledgment (HARQ-ACK) timing. This approach may reduce the number of bits needed in RRC/DCI signaling (e.g. $K0$, $K1$, K2 indication, reportSlotOffsetList indication). In some embodiments, the minimum offset of slots that a UE supports may be pre-defined in the 5G standard and/or may be reported by the UE based on UE capability signaling (e.g. the capability signaling on processing time). In some embodiments, the minimum offset of slots in scheduling may be configured via higher layer signaling and/or implicitly derived from the UE capability signaling. If the minimum offset is configured via higher layer signaling, the value may be greater than or equal to the minimum value supported by the UE. A larger offset value may allow for more efficient UE power management. In some embodiments, the minimum offset may be different for different SCS values. In some embodiments, the minimum offset value may be defined for each timing separately. While a minimum offset of slots may be used, an offset may also be defined in units of symbols representing processing time. Defining the offset in terms of symbols may provide additional specificity for providing time for UE processing. In some embodiments, the offset may also be provided in units other than slots or symbols. For example, the units may be expressed as multiple slots and/or multiple symbols.

In some embodiments, a minimum scheduling delay may be used for PDSCH scheduling. The 5G standard may define this delay. For example, a minimum scheduling delay may be defined as 1 or 2 slots to allow for PDCCH processing time. The UE may be provided time to perform PDCCH processing to recognize that the received PDSCH data is intended for that particular UE. Otherwise, the UE may waste resources buffering PDSCH data that is not intended for that UE. To provide this time, a gNB may use cross-slot scheduling that accounts for time from the start or end of a PDCCH data transmission to the start of a PDSCH transmission is not less than 1 or 2 slots. When a slot is 14 symbols in length, this scheduling of extra time may be 14 or 28 symbols. This scheduling offset may be notated by a K0 value indication in a DL DCI plus 1 or 2 slots.

In some embodiments, a gNB may identify a minimum scheduling delay based on a reporting received from a particular UE. For example, the UE may report a PDCCH decoding time of 1 slot or 14 symbols. In this case, the gNB may scheduling the timing delay based on this reporting. This delay may be 1 or 2 slots and/or 14 or 28 symbols. The gNB may configure a scheduling offset of Kd=2 slots and the scheduling offset in slot may be calculated from K0+Kd.

In the context of PUSCH preparation time for UE transmission to a gNB, the system may provide similar scheduling to accommodate the UE preparation time. This preparation time K2 may be similar to PDSCH processing time K1 or CSI computation time Z. In some embodiments, a PUSCH preparation time in a slot may be, for example, 80 symbols. To account for this preparation time, the gNB may schedule the start or end of a PDCCH transmission to the start of a PUSCH transmission as being equal to or greater than this amount. In some embodiments, when there are 14 symbols per slot, this delay of 80 symbols may be expressed as 5 slots and as Kd. The scheduling offset may be expressed as K2+Kd where K2 is indicated in a UL DCI. This offset may be predefined in the 5G standard.

In some embodiments, PUSCH preparation time may be determined based on a reporting of UE capabilities. For example, the UE may report to the gNB a PUSCH preparation time. This preparation time, for example, may have a length of 60 symbols. Based on this information, the gNB may use a delay of at least 60 symbols between the start or end of a PDCCH transmission and a scheduling a PUSCH transmission. This will again provide the UE with preparation time to transmit PUSCH data to the gNB. In some embodiments, a delay of 60 symbols may be a Kd of 4 slots with the scheduling offset being K2+Kd with K2 being indicated in the UL DCI. Based on this offset, the UE may be afforded PUSCH preparation time in view after decoding PDCCH data.

These embodiments and others will be further discussed below. The embodiments discussed herein provide processing time adjustments to account for PDSCH, PUSCH, and/or PDCCH processing. As will be further discussed below, another issue may be when PDSCH and/or PUSCH processing time is significantly larger than one slot. In this case, a UE may not be able to use a single processing engine to process PDSCHs and/or PUSCHs in a pipelined fashion. The UE may have the issue where a subsequently scheduled PDSCH or PUSCH occurs, but the UE may still be in the middle of processing the previously scheduled PDSCH or PUSCH. The embodiments described below address this scenario and address UE PDSCH/PUSCH processing capabilities. While PDSCH examples may be described in this disclosure for simplicity, the same techniques may be applied to PUSCH communications and vice versa. In some embodiments, PDSCH and PUSCH communications may be referred to collectively as physical data channel communications.

The embodiments below further address timing for PDCCH decoding. This timing may be considered alone and/or in combination with the timing provided for the PDSCH and/or PUSCH communications. By addressing PDCCH decoding latency along with PDSCH and/or PUSCH communications, more precise timing may be provided for UE communications with the gNB. This may also provide increased flexibility for UE power consumption. As will be further discussed below, other factors for consideration may include same-slot scheduling and/or cross-slot scheduling in the single-slot scheduling context. Further, the multi-slot scheduling context may also be applicable in addressing the timing for PDCCH decoding. Using the techniques described below, alone or in combination, a gNB may more efficiently schedule communications to and from a UE as well as among many UE. This consideration may also account for different processing capabilities of different UE participating in a 5G communication network.

Various embodiments of these features will now be discussed with respect to the corresponding figures.

FIG. 1 illustrates an example system 100 implementing flexible processing time adjustments for physical downlink shared channel (PDSCH) and/or physical uplink shared channel (PUSCH) communications, according to some embodiments. FIG. 1 illustrates an example system architecture 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 110A and UE 110B (collectively referred to as "UEs 110" or "UE 101"). In this example, UEs 110 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

The UEs 110 may be configured to connect, for example, communicatively coupled, with a Radio Access Network (RAN) including RAN nodes 120A, 120B. In embodiments, the RAN may be an NG RAN or a 5G RAN, an E-UTRAN, or a legacy RAN, such as a UTRAN or GERAN. As used herein, the term "NG RAN" or the like may refer to a RAN that operates in an NR or 5G system 100, and the term "E-UTRAN" or the like may refer to a RAN that operates in an LTE or 4G system 100. RAN nodes 120A, 120B and/or other gNB may be equipped with transceivers to communicate with UEs 110. The UEs 110 utilize connections (or channels), respectively, each of which comprises a physical communications interface or layer (discussed in further detail below).

In this example, the connections are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 110 may directly exchange communication data via a ProSe interface. The ProSe interface may alternatively be referred to as a SL interface and may comprise one or more logical channels, including but not limited to a PSCCH, a PSSCH, a PSDCH, and a PSBCH.

The UE 110B may be configured to access an access point (AP) (also referred to as "WLAN node," "WLAN," "WLAN Termination," "WT" or the like). The connection can comprise a local wireless connection, such as a connection consistent with any IEEE 802.11 protocol, wherein the AP would comprise a wireless fidelity (Wi-Fi®) router. In this example, the AP is shown to be connected to the Internet without connecting to the core network of the wireless system (described in further detail below). In various embodiments, the UE 110B, RAN, and AP may be configured to utilize LWA operation and/or LWIP operation. The LWA operation may involve the UE 110B in RRC_CONNECTED being configured by a RAN node 120A, 120B to utilize radio resources of LTE and WLAN. LWIP operation may involve the UE 110B using WLAN radio resources via IPsec protocol tunneling to authenticate and encrypt packets (e.g., IP packets) sent over the connection. IPsec tunneling may include encapsulating the entirety of original IP packets and adding a new packet header, thereby protecting the original header of the IP packets.

The RAN can include one or more AN nodes or RAN nodes 120A and 120B (collectively referred to as "RAN nodes 120" or "RAN node 120"). As used herein, the terms "access node," "access point." or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 120 that operates in an NR or 5G system 100 (for example, a gNB), and the term "E-UTRAN node" or the like may refer to a RAN node 120 that operates in an LTE or 4G system 100 (e.g., an eNB). According to various embodiments, the RAN nodes 120 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. RAN nodes 120A, 120B may be equipped with one or more transceivers configured to establish 5G communications with UEs 110. These one or more transceivers may facilitate PDSCH, PUSCH, PDCCH, and/or PUCCH communications. The transceivers may also facilitate other types of communications. As will be further explained below, RAN nodes 120A, 120B may receive reports detailing UE 110 processing capabilities. These reports may be received using the transceivers. Similarly, communications on the aforementioned channels may be schedule and performed using the transceivers.

In some embodiments, all or parts of the RAN nodes 120 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 120: a MAC/PHY split wherein RRC, PDCP, RLC, and MAC layers are operated by the CRAN/vBBUP and the PHY layer is operated by individual RAN nodes 120; or a "lower PHY" split wherein RRC, PDCP, RLC, MAC layers and upper portions of the PHY layer are operated by the CRAN/vBBUP and lower portions of the PHY layer are operated by individual RAN nodes 120. This virtualized framework allows the freed-up processor cores of the RAN nodes 120 to perform other virtualized applications. In some implementations, an individual RAN node 120 may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the RAN (not shown) or by a server pool in a similar manner as the CRAN/vBBUP. Additionally or alternatively, one or more of the RAN nodes 120 may be next generation eNBs (ng-eNBs), which are RAN nodes that provide E-UTRA user plane and control plane protocol terminations toward the UEs 110, and are connected to a 5GC via an NG interface (discussed infra).

In V2X scenarios one or more of the RAN nodes 120 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 110 (vUEs 110). The RSU may also include internal data storage circuitry to store intersection map geometry, traffic statistics, media, as well as applications/software to sense and control ongoing vehicular and pedestrian traffic. The RSU may operate on the 5.9 GHZ Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHZ band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 120 can terminate the air interface protocol and can be the first point of contact for the UEs 110. In some embodiments, any of the RAN nodes 120 can fulfill various logical functions for the RAN including, but not limited to, radio network controller (RNC) functions such as radio bearer management, uplink and downlink dynamic radio resource management and data packet scheduling, and mobility management.

In embodiments, the UEs 110 can be configured to communicate using OFDM communication signals with each other or with any of the RAN nodes 120 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 120 to the UEs 110, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements: in the frequency domain, this may represent the smallest quantity of resources that currently can be allocated. There are several different physical downlink channels that are conveyed using such resource blocks.

According to various embodiments, the UEs 110 and the RAN nodes 120 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 110 and the RAN nodes 120 may operate using LAA, eLAA, and/or feLAA mechanisms. In these implementations, the UEs 110 and the RAN nodes 120 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 110, RAN nodes 120, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 110, AP, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds ($\mu$s): however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHZ. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 110. The PDCCH carries information about the transport format and resource allocations related to the PDSCH channel, among other things. It may also inform the UEs 110 about the transport format, resource allocation, and HARQ information related to the uplink shared channel. Typically, downlink scheduling (assigning control and shared channel resource blocks to the UE 110B within a cell) may be performed at any of the RAN nodes 120 based on channel quality information fed back from any of the UEs 110. The downlink resource assignment information may be sent on the PDCCH used for (e.g., assigned to) each of the UEs 110.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 120 may be configured to communicate with one another via an interface. In embodiments where the system 100 is an LTE system (e.g., when core network (CN) 140 is an EPC), the interface may be an X2 interface. The X2 interface may be defined between two or more RAN nodes 120 (e.g., two or more eNBs and the like) that connect to EPC, and/or between two eNBs connecting to EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB: information about successful in sequence delivery of PDCP PDUs to a UE 110 from an SeNB for user data: information of PDCP PDUs that were not delivered to a UE 110; information about a current minimum desired buffer size at the SeNB for transmitting to the UE user data; and the like. The X2-C may provide intra-LTE access mobility functionality, including context transfers from source to target eNBs, user plane transport control, etc.: load management functionality: as well as inter-cell interference coordination functionality.

In embodiments where the system 100 is a 5G or NR system (e.g., when CN 140 is an 5GC), the interface may be an Xn interface. The Xn interface is defined between two or more RAN nodes 120 (e.g., two or more gNBs and the like) that connect to 5GC, between a RAN node 120 (e.g., a gNB) connecting to 5GC and an eNB, and/or between two eNBs connecting to 5GC. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface: mobility support for UE 110 in a connected mode (e.g., CM-CONNECTED) including functionality to manage the UE mobility for connected mode between one or more RAN nodes 120. The mobility support may include context transfer from an old (source) serving RAN node 120 to new (target) serving RAN node 120; and control of user plane tunnels between old (source) serving RAN node 120 to new (target) serving RAN node 120. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN is shown to be communicatively coupled to a core network—in this embodiment, core network (CN) 120. The CN 140 may comprise a plurality of network elements 130, which are configured to offer various data and telecommunications services to customers/subscribers (e.g., users of UEs 110) who are connected to the CN 140 via the RAN. The components of the CN 140 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 140 may be referred to as a network slice, and a logical instantiation of a portion of the CN 140 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 150 may be an element offering applications that use IP bearer resources with the core network (e.g., UMTS PS domain, LTE PS data services, etc.). The application server 150 can also be configured to support one or more communication services (e.g., VoIP sessions, PTT sessions, group communication sessions, social networking services, etc.) for the UEs 110 via the CN 140.

In embodiments, the CN 140 may be a 5GC, and the RAN may be connected with the CN 140 via an NG interface. In embodiments, the NG interface may be split into two parts, an NG user plane (NG-U) interface, which carries traffic data between the RAN nodes 120 and a UPF, and the SI control plane (NG-C) interface, which is a signaling interface between the RAN nodes 120 and AMFs.

Figure 2:
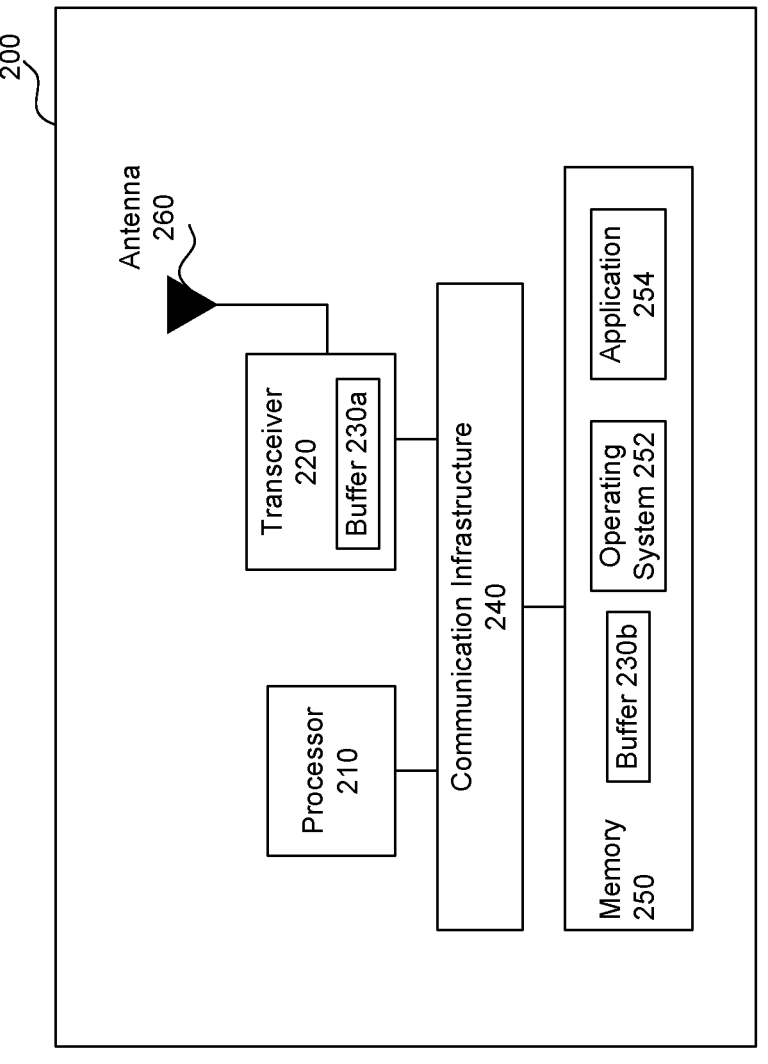
FIG. 2 illustrates a block diagram of an example wireless system of an electronic device implementing flexible processing time techniques for PDSCH and/or PUSCH communications, according to some embodiments of the disclosure.

FIG. 2 illustrates a block diagram of an example wireless system of an electronic device implementing flexible processing time techniques for PDSCH and/or PUSCH communications, according to some embodiments of the disclosure. System 200 may be any of the UE 110 electronic devices and/or RAN nodes 120 of system 100. System 200 includes processor 210, transceiver 220, buffer(s) 230a and 230b, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

Alternatively or in addition to the operating system, system 200 can include communication infrastructure 240). Communication infrastructure 240) provides communication between, for example, processor 210, transceiver 220, and memory 250. In some implementations, communication infrastructure 240) may be a bus. When operating as a UE, processor 210) together with instructions stored in memory 250 perform operations enabling wireless system 200 of system 100 to implement the capability reporting, PDSCH processing, and/or PUSCH transmission preparations as described herein. Additionally or alternatively, transceiver 220 performs operations enabling wireless system 200 as UE 110 of system 100 to implement the flexible processing time techniques for PDSCH, PUSCH, and/or PDCCH communications as described herein.

When operating as a UE and/or a gNB, transceiver 220 transmits and receives PDSCH, PUSCH, and/or PDCCH communications signals, according to some embodiments, and may be coupled to antenna 260. Transceiver 220 may also transmit and/or receive the UE reporting described herein. Antenna 260 may include one or more antennas that may be the same or different types. Transceiver 220 allows system 200 to communicate with other devices that may be wired and/or wireless. Transceiver 220 can include processors, controllers, radios, sockets, plugs, buffers, and like circuits/devices used for connecting to and communication on networks. According to some examples, transceiver 220 includes one or more circuits to connect to and communicate on wired and/or wireless networks. Transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, etc.).

According to some embodiments, processor 210, alone or in combination with memory 250, and/or transceiver 220, implements the flexible processing time techniques and reporting of UE capabilities to a gNB. For example, when system 200 operates as a UE, system 200 is configured to generate and transmit PUSCH communications associated with a buffer (e.g., buffer 230a and/or buffer 230b) of transceiver 220. Similarly, system 200 may use buffer 230a and/or buffer 230b when processing communications received via PDSCH. When system 200 operates as a gNB, transceiver 220 may be used to transmit PDSCH communications to a UE and/or receive PUSCH communications from a UE. Further, transceiver 220 may receive the reporting of UE capabilities at the gNB.

According to some examples, processor 210, alone or in combination with transceiver 220 and/or memory 205 can receive rules and/or parameters for PDSCH and/or PUSCH communications from, for example, RAN node 120. For example, RAN node 120 may transmit control information related to frequency domain resource allocations and/or resource block (RB) allocations. In some embodiments, when system 200 operates as a UE, system 200 may report UE processing and/or preparation capabilities via RRC signaling on a PUSCH. Processor 210, alone or in combination with transceiver 220 and/or memory 205, can determine, generate, and transmit the PUSCH communications using received rules and/or parameters from RAN node 120.

When system 200 operates as a gNB or a RAN node 120, processor 210, alone or in combination with transceiver 220 and/or memory 205, may determine, generate, and transmit PDSCH and/or PDCCH communications to a UE.

Also, when operating as a UE, processor 210, alone or in combination with transceiver 220 and/or memory 205, can receive UL MU transmission schedule from, for example, RAN node 120 and transmit the buffered data based on the received UL MU transmission schedule.

Figure 3A:
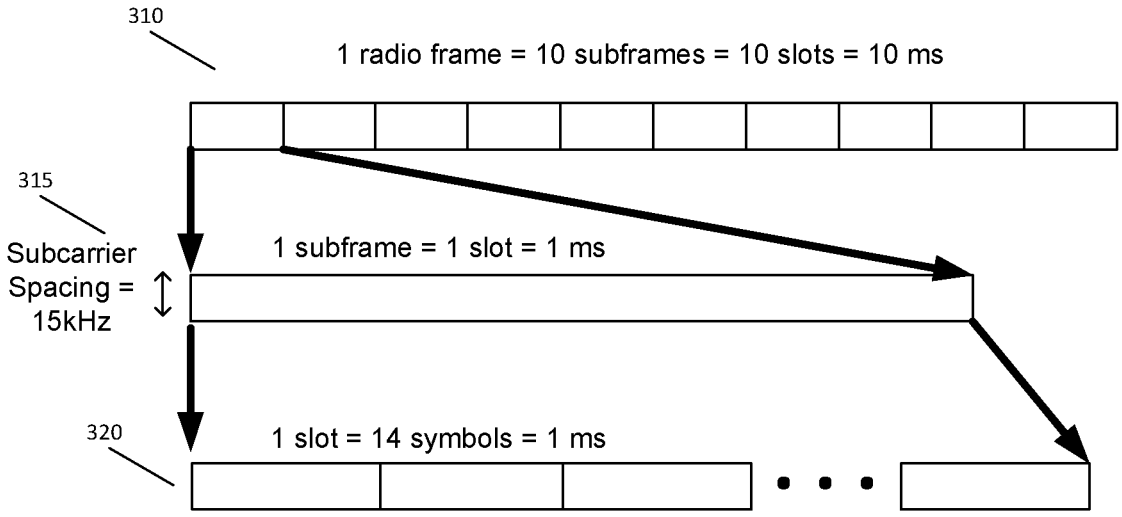
FIG. 3A illustrates a block diagram of a slot length for a first subcarrier spacing (SCS), according to some embodiments.

FIG. 3A illustrates a block diagram of a slot length for a first subcarrier spacing (SCS), according to some embodiments. In the 5G/NR context, data may be communication using radio frame 310. For example, radio frame 310 may be used to transmit data on a PDSCH and/or PUSCH between a gNB and UE. In some embodiments, radio frame 310 will be a duration of 10 ms. Radio frame 310 may be comprised of subframes, such as subframe 315. In the 5G/NR context, radio frame 310 may be comprised of 10 subframes 315. Each subframe 315 may have a duration of 1 ms. A subframe 315 may be comprised of a number of slots. While the number of slots within a subframe 315 may vary based on the subcarrier spacing (SCS) frequency, the duration of the subframe 315 may be consistent. Further, each slot may also consistently carry 14 symbols of data. This may be independent of SCS frequency as well.

To illustrate an example, for an SCS frequency of 15 kHz, one subframe may be comprised of one slot 320. Slot 320 may carry 14 symbols of information and may last for a duration of 1 ms.

Figure 3B:
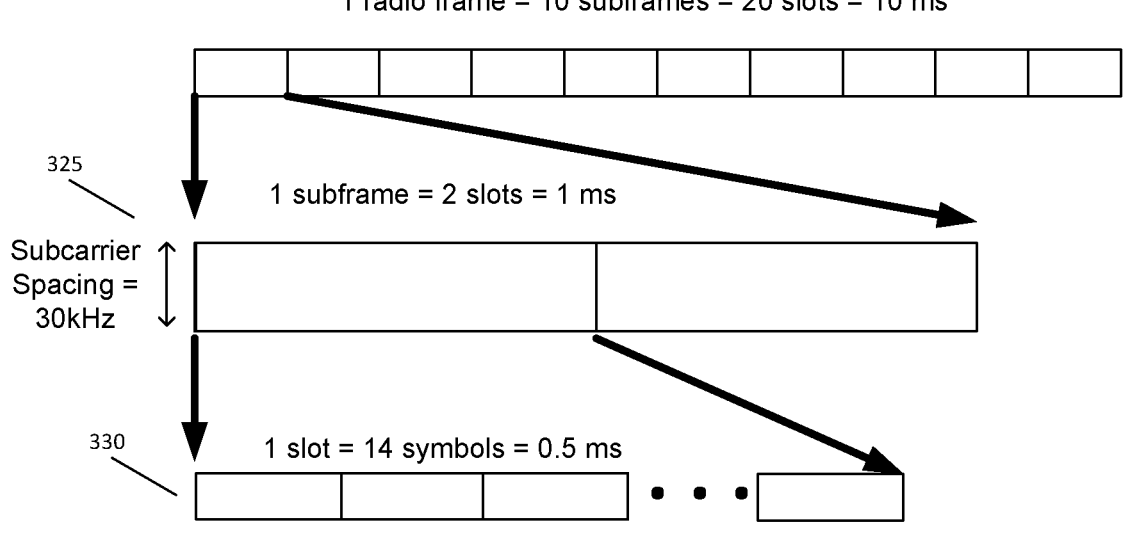
FIG. 3B illustrates a block diagram of a slot length for a second SCS, according to some embodiments.
Figure 3C:
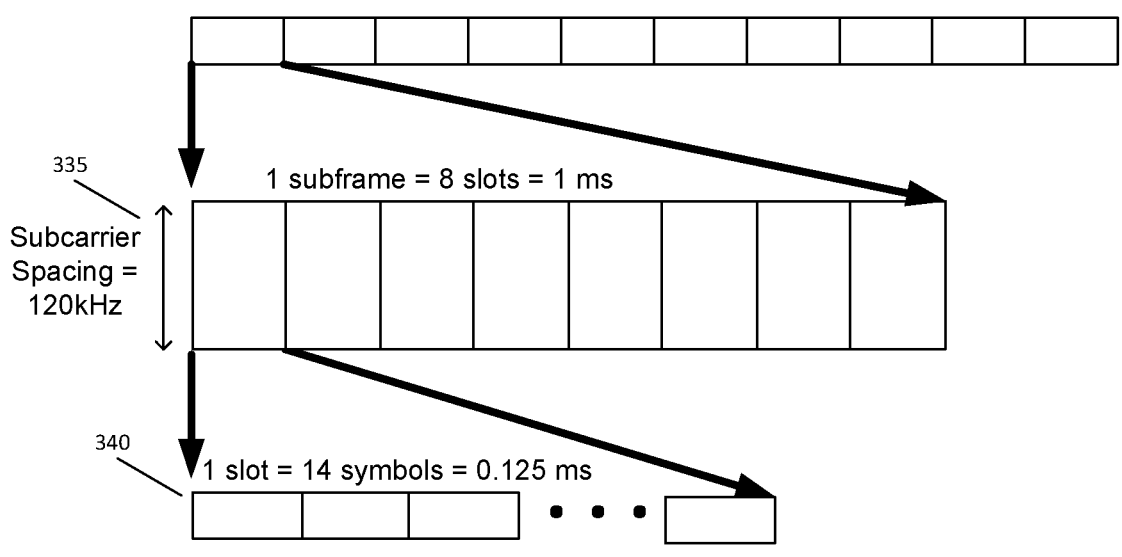
FIG. 3C illustrates a block diagram of a slot length for a third SCS, according to some embodiments.
Figure 3D:
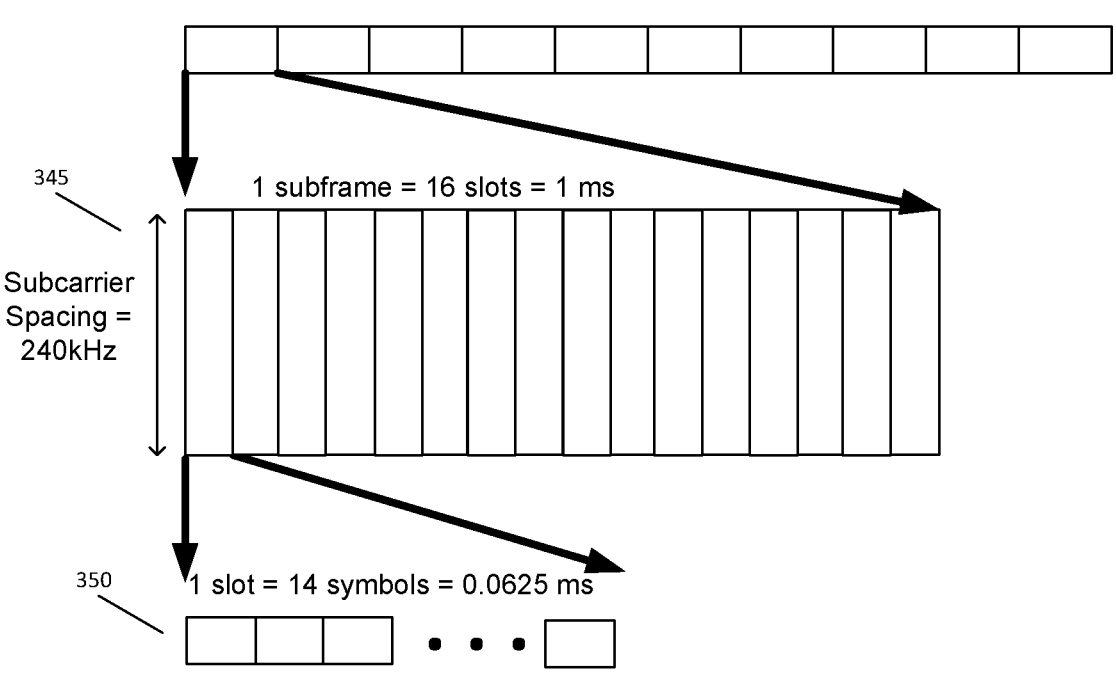
FIG. 3D illustrates a block diagram of a slot length for a fourth SCS, according to some embodiments.

Turning to FIG. 3B, a higher SCS frequency of 30 KHz is displayed. FIG. 3B illustrates a block diagram of a slot length for a second SCS, according to some embodiments. In this case, 1 radio frame may still include 10 subframes and last for 10 ms, but may instead include 20 slots. This occurs because one subframe 325 may be divided into two slots for the 30 kHz SCS. The timing for subframe 325, however, may still be 1 ms. In this case, one slot 330 may still carry 14 symbols but may be allotted a duration of 0.5 ms. In this manner, relative to FIG. 3A, as the SCS frequency is increase, the amount of time per slot is decreased. FIG. 3C and FIG. 3D provide additional examples of decreasing slot times with increased SCS frequency.

FIG. 3C illustrates a block diagram of a slot length for a third SCS, according to some embodiments. As seen from FIG. 3C, with a SCS of 120 kHz, each subframe 335 includes 8 slots while still having a duration of 1 ms. In this case, each slot 340 is provided with 0.125 ms to deliver 14 symbols of data.

FIG. 3D illustrates a block diagram of a slot length for a fourth SCS, according to some embodiments. As seen from FIG. 3D, with a SCS of 240 kHz, each subframe 345 includes 16 slots while still having a duration of 1 ms. In this case, each slot 350 is provided with 0.0625 ms to deliver 14 symbols of data.

As seen from FIGS. 3A-3D, as SCS frequency increases, the amount of time provided for a slot decreases. This reduction may continue as the SCS frequency increases to, for example, 480 kHz and/or 960 kHz. In view of this reduced slot time, hardware and/or processing limitations of a UE in unit of slots or symbols may not be the same as or similar to that for lower SCSs. That is, the UE processing time for PDSCH, PUSCH, and/or PDCCH communications in unit of slots or symbols may increase significantly as SCS increases. The embodiments described herein address this issue and provide timing and/or scheduling techniques to provide UEs with sufficient time to process received data and/or prepare data for transmission. Examples of these times are further discussed with reference to FIGS. 4A-4C.

FIG. 4A illustrates a block diagram of PDSCH processing times, according to some embodiments. Using equation 405 as well as tables 420 and 430, a gNB may recognize UE PDSCH processing time. For example, equation 405 includes an equation for calculating a PDSCH processing time ($T_{proc,1}$). Equation 405 includes several factors including PDSCH decoding time $N_1$ 410 as well as an adjustment factor $d_{1,1}$ 415. The PDSCH decoding time $N_1$ 410 may be determined using tables 420, 430. Tables 420, 430 depict different configurations 425 that correspond to different SCS frequency values. In this manner, for a particular SCS frequency value, a corresponding configuration 425 may be identified and its corresponding PDSCH decoding time $N_1$ 410 may be identified. This PDSCH decoding time $N_1$ 410 may be expressed as a number of symbols.

One issue with tables 420, 430, however, is that they do not explain how to determine a PDSCH decoding time $N_1$ for higher SCS frequencies, such as 480 kHz or 960 kHz. What tables 420, 430 do illustrate, however, is that the number of symbols required for processing will increase and may require multiple slots of processing time as SCS frequency increases. For example, for a 120 KHz SCS, the PDSCH processing time is 20 symbols without additional DMRS or 24 symbols with additional DMRS. Assuming the same absolute PDSCH processing time and assuming that there are 14 symbols per slot, for a 480 kHz SCS, approximately 6 slots will be used. Similarly, for a 960 kHz SCS, approximately 11 slots will be used. In view of these trends, multiple slots of PDSCH processing time will be used by UEs as the SCS frequency increases. This trend may similarly occur for PUSCH preparation times.

Figure 4B:
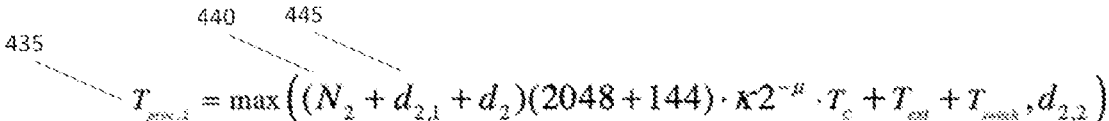
FIG. 4B illustrates a block diagram of PUSCH preparation times, according to some embodiments.

FIG. 4B illustrates a block diagram of PUSCH preparation times, according to some embodiments. Using equation 435 as well as tables 450 and 460, a gNB may recognize UE PUSCH preparation time. For example, equation 435 includes an equation for calculating a PUSCH preparation time ($T_{proc}$). Equation 435 includes several factors including PUSCH preparation time $N_2$ 440 as well as an adjustment factor $d_{2,1}$ 445. The PUSCH preparation time $N_2$ 440 may be determined using tables 450, 460. Tables 450, 460 depict different configurations 455 that correspond to different SCS frequency values. In this manner, for a particular SCS frequency value, a corresponding configuration 455 may be identified and its corresponding PUSCH preparation time $N_2$ 440 may be identified. This PUSCH preparation time $N_2$ 440 may be expressed as a number of symbols.

Similar to PDSCH decoding time $N_1$ 410, PUSCH preparation time $N_2$ 440 may increase in number of symbols as the SCS frequency increases. Tables 450, 460 further do not explain how to determine a PUSCH preparation time $N_2$ 440 for higher SCS frequencies, such as 480 kHz or 960 kHz. Similar to PDSCH, however, tables 450, 460 do illustrate that is that the number of symbols required for preparation will increase and may require multiple slots of processing time as SCS frequency increases. For example, for a 120 kHz SCS, the PUSCH processing time is 36 symbols. Assuming the same absolute PDSCH processing time and assuming that there are 14 symbols per slot, for a 480 KHz SCS, approximately 10 slots will be used. Similarly, for a 960 KHz SCS, approximately 20 slots will be used. In view of these trends, multiple slots of PUSCH preparation time will be used by UEs as the SCS frequency increases.

For both PDSCH and PUSCH processing, even if the absolute processing time is reduced relative to the 120 kHz SCS, multiple slots would still be used to perform this processing and/or preparation. In this manner, the embodiments below describe techniques to account for this processing and/or preparation time and to efficiently schedule communications between a gNB and a UE.

FIG. 4C illustrates a block diagram of CSI computation delay times, according to some embodiments. In addition to PDSCH and PUSCH processing, delays may be provided to account for a minimum CSI computation time. Tables 470, 480 provide timing for CSI computations. For the 120 kHz SCS configuration, multiple slots may used based on the symbols listed in tables 470, 480. Thus, for higher SCS such as 480 KHz or 960 kHz, additional also may also be used.

In view of the processing and preparation times described in FIG. 4A-4C, as SCS frequencies continue to increase, the processing time in symbols may further continue to increase. This may affect PDSCH processing time, PUSCH processing, and/or CSI computation time. Further, PDCCH decoding may also become more of a factor as SCS increases. For example, if PDCCH decoding for an SCS of 120 KHz is a few symbols, decoding time for an SCS of 480 kHz or 960 kHz may be one or more slots. As previously explained, several techniques have already been described for accommodating the PDCCH decoding. This will be further explained with reference to FIG. 7 and FIG. 8. As will be discussed further, by flexibly accommodating a PDCCH decoding budget rather than imposing a rigid budget, a UE may have better power consumption management by using a lower clock rate. Prior to this discussion, FIGS. 5A, 5B, 6A, and 6B discuss techniques for accommodating UE processing capabilities for PDSCH and/or PUSCH communications. PDSCH and/or PUSCH communications may be referred to collectively as physical data channel communications.

FIG. 5A illustrates a flowchart 500A for PDSCH scheduling based on user equipment (UE) PDSCH processing capability reporting, according to some embodiments. In some embodiments, a gNB such as RAN nodes 120A, 120B may execute flowchart 500A. For example, RAN nodes 120A, 120B may interact with UEs 110 and/or system 200 to execute flowchart 500A. In some embodiments, application server 150 and/or 140 may operate with RAN nodes 120A, 120B to execute flowchart 500A. Flowchart 500A shall be described with reference to a gNB: however, flowchart 500A is not limited to that example embodiment. Flowchart 500A may be executed on any computing device, such as, for example, the computer system described with reference to FIG. 9 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5A, as will be understood by a person of ordinary skill in the art.

At 505, a 5G Node B (gNB) may establish communication with a user equipment (UE). For example, the UE may register with the gNB to transmit and/or receive information. This may occur similar to the communications described with reference to FIG. 1 between UE 110 and RAN node 120. In some embodiments, the communication between the UE and gNB may occur via 5G communications so that the UE may communicate with CN 140. In some embodiments, the establishing of communications may include a UE using Radio Resource Control (RRC) protocol to establish a connection. For example, the UE may move from a disconnected or idle RRC state to an RRC connected state to communicate with the gNB. The SCS frequency may also be established, which may be 480 kHz or 960 KHz.

Figure 6A:
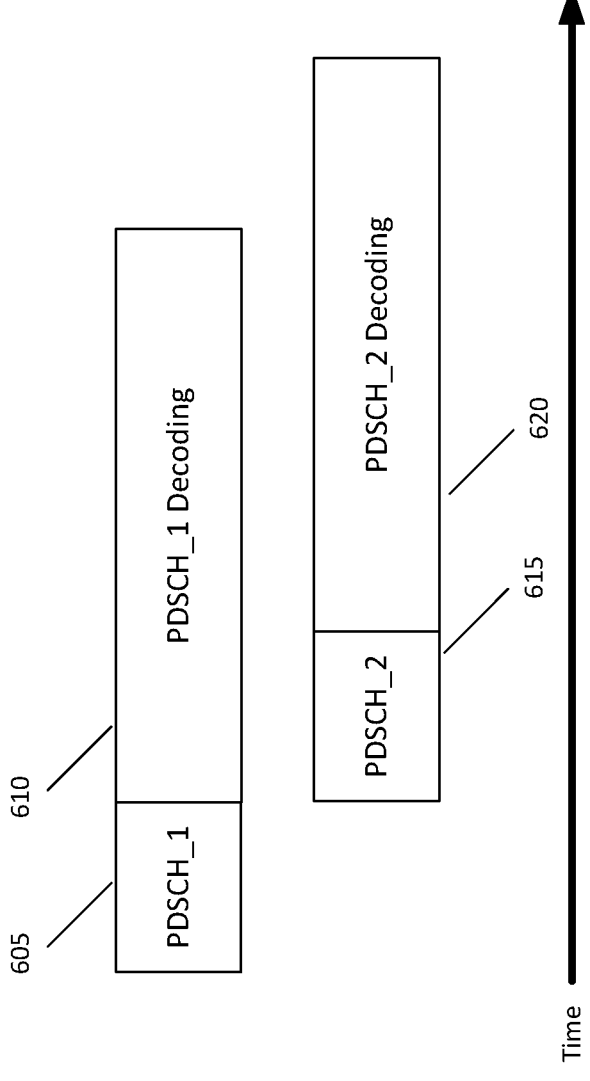
FIG. 6A illustrates a block diagram of overlapping PDSCH data transmissions, according to some embodiments.

At 510, the gNB may receive, from the UE, an indication of UE processing capabilities indicating a data processing rate for PDSCH data. As previously explained, as the SCS frequency increases, PDSCH processing time may be larger than one slot of time. In this manner, a UE may not be able to use a single processing engine to process PDSCH data fast enough in a pipelined fashion. This may lead the UE to encounter a situation where subsequent PDSCH data is received before the UE has finished processing previously received PDSCH data. This may occur if, for example, the UE is limited to a single or limited amount of processing engines for parallel processing. FIG. 6A depicts this situation. FIG. 6A illustrates a block diagram 600A of overlapping PDSCH data transmissions, according to some embodiments. For example, at 605, a UE may receive a first PDSCH data transmission. At 610, the UE may spend time decoding and/or processing the first PDSCH data transmission. During this processing, however, at 615, the UE may receive a second PDSCH data transmission. The UE will then be expected to perform the first PDSCH decoding 610 along with the second PDSCH decoding 620.

In some embodiments, to process the first and the second PDSCH data transmissions, the UE may use multiple processing engines in parallel. Each processing engine may process a stream of PDSCH data. In this case, a gNB may schedule PDSCH data transmission 605, 615 in consecutive slots. The UE may then parse received PDSCH data 605, 615 into different processing engines that may process the data in parallel. This technique of multiple processing engines may be used alone or in combination with the UE reporting techniques described below.

In some situations, however, a UE may not have sufficient processing resources to perform parallel processing. For example, the UE may use a single processing engine and/or may have limited processing resources. In this case, the gNB may be limited in how to schedule transmitting PDSCH data. To address this issue, UE may report one or more processing statistics to indicate the UE's processing capabilities. The gNB may use this information to ensure that the UE receives PDSCH data at a pace at which the UE can process the data. For example, if multi-slot scheduling is used by the gNB, the gNB may ensure that the UE capability is not exceeded. For example, the gNB may need to add gaps between scheduled PDSCHs.

To illustrate potential processing statistics, the UE may report a rate of processing PDSCH. For example, the UE may report being able to process a particular amount of PDSCH data per slot. This data may be, for example, one or more data packets. In some embodiments, the UE may express this capability as M PDSCH data every N slots, where M and N are variable amounts depending on the UE capabilities. For example, the value of M and/or N may depend on the PDSCH processing time and the amount of PDSCH data the UE may be able to process in parallel. In this manner, the UE may account for multiple processing engines when reporting to the gNB as well. The UE may report capabilities for a single processing engine and/or multiple processing engines. In some embodiments, the UE may report the N slots as a sliding window of time. For example, for a UE using a single processing engine, if the PDSCH processing time is 4 slots, the UE may report that it can process one set of PDSCH data every 4 or 5 slots depending on the UE pipelining.

As previously explained in some embodiments, the UE may report UE capability regarding how many PDSCH data transmissions that the UE can process in parallel. In this case, when determining the number of parallel PDSCH data transmission, the UE and/or the gNB may also count the PDSCH transmission time as well as the PDSCH decoding time. With this information, the gNB may ensure that the number of PDSCH data transmissions decoded in parallel does not exceed the UE's capabilities.

In some embodiments, the UE may report UE capability as a sum data rate that the UE can support within a time window. For example, the time window may be equal to or approximately equal to the PDSCH processing time. In some embodiments, a buffer time may also be added. For example, an extra one slot of time may be added to the PDSCH processing time to account for the PDSCH transmission time. In some embodiments, the sum data rate may be applied across each of the component carriers (CCs) used in communication between the UE and the gNB. In this case, the UE may share the processing power among the CCs. For example, when one CC does not include PDSCH data, more or additional PDSCH data may be processed on another CC.

Figure 6B:
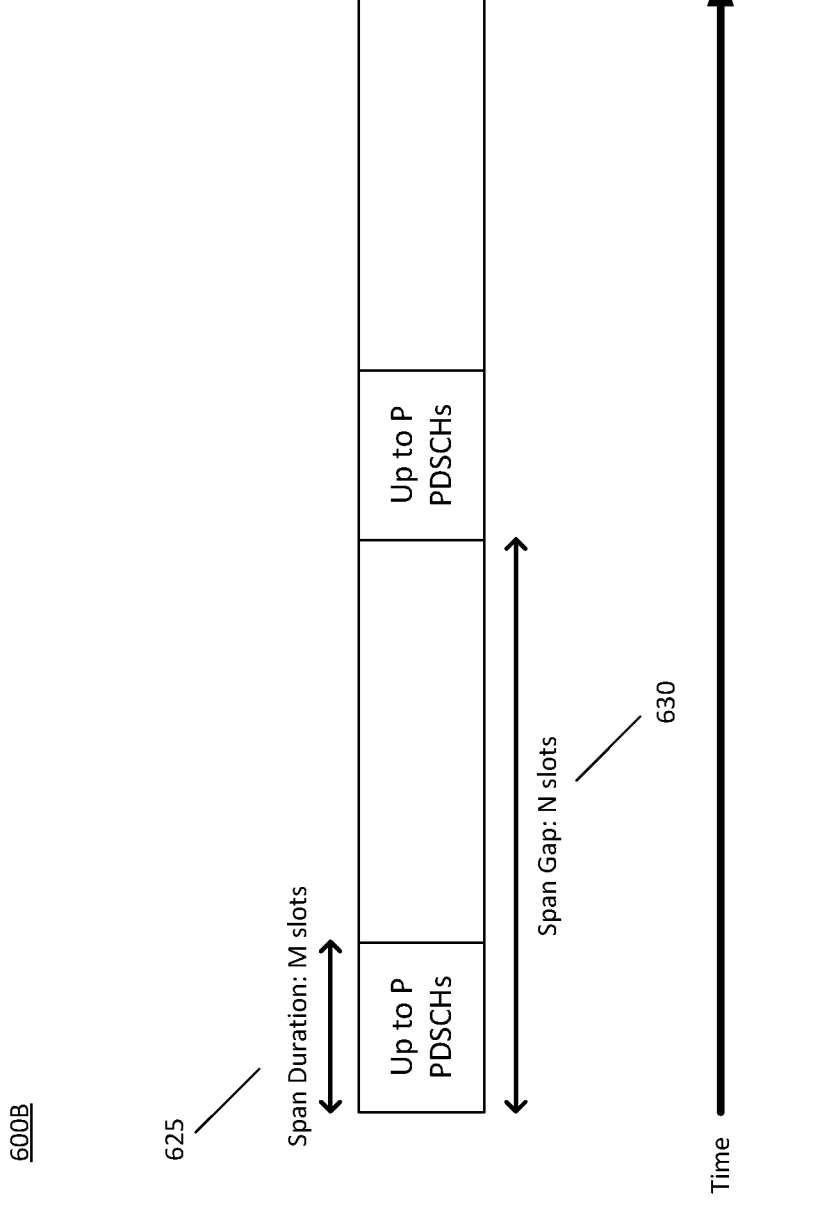
FIG. 6B illustrates a block diagram of PDSCH data transmissions with a span pattern, according to some embodiments.

In some embodiments, the UE may report a span pattern that the UE can support for PDSCH processing. FIG. 6B depicts an example of this measurement. FIG. 6B illustrates a block diagram 600B of PDSCH data transmissions with a span pattern, according to some embodiments. As seen from FIG. 6B, a span duration 625 may last for a span duration of M slots. This span duration 625 may be within a span gap 630, which may last for a duration of N slots. With the N-slot span gap 630, the UE may report the number of PDSCHs (e.g., an integer value of "P") that the UE can processing within an M-slot span duration 625.

Several processing statistics have been discussed for reporting from the UE to the gNB. UE may transmit any one of these processing statistics to report the UE's processing capabilities. In some embodiments, a combination of one or more of these processing statistics may be reported from the UE to the gNB. Further, the processing of this data may occur at the UE or the gNB. For example, the UE may report this data after performing a self-analysis of its processing capabilities. In some embodiments, the UE may report raw data related to these processing capabilities and the gNB may perform additional processing to derive the UE processing capabilities. In either case, at 510, the gNB may receive a report from the UE indicating the UE processing capabilities for processing PDSCH data.

At 515, the gNB may calculate a time delay based on the indication received from the UE. Based on the data received from the UE, such as parallel processing capabilities and/or a rate of PDSCH data transmissions that the UE can process, the gNB may determine a number of slots to delay scheduling a subsequent PDSCH transmission. For example, if the UE reports that it uses 4 slots of PDSCH processing time, the gNB may determine that PDSCH transmissions will be separated by 4 slots in the scheduling. In some embodiments, if additional buffer time is included for pipelining, the gNB may separate the PDSCH transmissions by 5 slots. In this manner, the gNB may avoid the situation of sending a subsequent PDSCH transmission too quickly before a UE has been able to process a previously received PDSCH transmission. As previously explained, the gNB may use one or more processing statistics provided by the UE to calculate a time delay as well. For example, the gNB may combine different and/or multiple parameters reported by the UE to calculate the time delay. Further, the gNB may recalculate a time delay if the UE reports updated processing capabilities. In some embodiments, the time delay may be expressed slots or symbols.

In some embodiments, gNB may calculate the time delay as a zero value depending on the capabilities of the UE. For example, if the UE reports that the UE uses multiple processing engines in parallel capable of individually processing different PDSCH transmissions, the gNB may determine that no time delay is needed.

At 520, the gNB may schedule a first PDSCH transmission from the gNB to the UE in a first slot. At 525, the gNB may schedule a second PDSCH transmission from the gNB to the UE in a second slot, wherein the second slot if separated from the first slot by at least the time delay. By scheduling this second PDSCH transmission with a sufficient time delay, the UE may be afforded time to process the first PDSCH transmission based on the capabilities of the UE. Further, the time delay may be tailored to the capabilities of the UE and provide flexibility. This flexibility may be helpful when the gNB services multiple UEs with different capabilities. This time delay may further aid in avoiding a situation in prematurely transmitting PDSCH data before a UE is capable of processing it. In some embodiments, the gNB may perform 520 prior to 515. For example, the gNB may consider whether one or more PDSCHs were previously scheduled prior to calculating the time delay. In some embodiments, as will be further explained below, the time delay may be further modified with additional time to account for PDCCH processing. For example, the gNB may schedule the time delay with an additional adjustment factor to account for potential UE PDCCH processing. While the foregoing description has described the time delay in terms of slots, in some embodiments, this delay may also be determined and/or expressed in terms of symbols.

FIG. 5B illustrates a flowchart 500B for PUSCH scheduling based on user equipment (UE) PUSCH preparation capability reporting, according to some embodiments. In some embodiments, a gNB such as RAN nodes 120A, 120B may execute flowchart 500B. For example, RAN nodes 120A, 120B may interact with UEs 110 and/or system 200 to execute flowchart 500B. In some embodiments, application server 150 and/or 140 may operate with RAN nodes 120A, 120B to execute flowchart 500B. Flowchart 500B shall be described with reference to a gNB: however, flowchart 500B is not limited to that example embodiment. Flowchart 500B may be executed on any computing device, such as, for example, the computer system described with reference to FIG. 9 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 5B, as will be understood by a person of ordinary skill in the art.

In some embodiments, PUSCH processing and/or preparation timing for the UE may be similar to PDSCH processing described with reference to FIG. 5A. In the PUSCH context, the UE may use preparation time to prepare data to send to the gNB via PUSCH transmissions. In this case, because the gNB still schedules when the UE may perform the PUSCH transmissions, the gNB may still schedule these PUSCH transmissions accounting for the UE's processing time. The gNB may schedule these transmissions based on a received reporting of capabilities from the UE. The UE may then transmit PUSCH data according to the gNB scheduling. This preparation may be particularly relevant as the SCS frequency becomes higher, such as to 480 kHz or 960 KHz.

At 530, a 5G Node B (gNB) may establish communication with a user equipment (UE). This may occur in a manner similar to that described at 505 with reference to FIG. 5A. At 535, the gNB may receive, from the UE, an indication of UE processing capabilities indicating a data preparation rate for physical uplink shared channel (PUSCH) data. This reporting may be similar to the reporting described with respect to PDSCH data as described with reference to 510. For example, at 535, the UE may report whether it is capable of using multiple preparation engines to prepare PUSCH transmissions. The UE may also report a number of PUSCH transmissions that the UE can prepare in a particular number of slots. The UE may also report a sum data rate within a time window and/or a span pattern in a similar manner as well.

At 540, the gNB may calculate a time delay based on the indication received from the UE. This may occur similar to the calculation from 515. The calculation at 540 may determine a particular delay to provide UE with sufficient time to prepare a PUSCH transmission. In this way, the gNB may avoid a scenario where two PUSCHs are scheduled too close together and the UE is unable to complete the preparation and transmit PUSCH data in time.

At 545, the gNB may schedule a first PUSCH transmission from the UE to the gNB in a first slot. At 550, the gNB may schedule a second PUSCH transmission from the UE to the gNB in a second slot, wherein the second slot is separated from the first slot at least by the time delay. By scheduling this second PUSCH transmission with a sufficient time delay, the UE may be afforded time to prepare the second PUSCH transmission based on the capabilities of the UE. Further, the time delay may be tailored to the capabilities of the UE and provide flexibility. This flexibility may be helpful when the gNB services multiple UEs with different capabilities. While the foregoing description has described the time delay in terms of slots, in some embodiments, this delay may also be determined and/or expressed in terms of symbols.

In some embodiments, flowchart 500B may be used in conjunction with flowchart 500A. For example, a gNB may execute both flowcharts 500A, 500B. The gNB may determine a first time delay corresponding to PDSCH data as well as a second time delay corresponding to PUSCH data. In this case, the gNB may calculate a second time delay based on PUSCH capabilities of the UE. The gNB may then schedule a first PDSCH transmission in a first slot with a second PDSCH transmission in a second slot separated by a first time delay. The gNB may then scheduling a first PUSCH transmission in a third slot and a second PUSCH transmission in a fourth slot separated by the second time delay.

FIG. 7 illustrates a flowchart 700 for UE processing time adjustments based on physical downlink control channel (PDCCH) decoding when determining PDSCH processing time, according to some embodiments. In some embodiments, a gNB such as RAN nodes 120A, 120B may execute flowchart 700. For example, RAN nodes 120A, 120B may interact with UEs 110 and/or system 200 to execute flowchart 700. In some embodiments, application server 150 and/or 140 may operate with RAN nodes 120A, 120B to execute flowchart 700. Flowchart 700 shall be described with reference to a gNB; however, flowchart 700 is not limited to that example embodiment. Flowchart 700 may be executed on any computing device, such as, for example, the computer system described with reference to FIG. 9 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 7, as will be understood by a person of ordinary skill in the art.

In some embodiments, PDCCH decoding timing for the UE may be significant for higher frequency SCS. For example, PDCCH decoding timing may be particularly relevant as the SCS frequency becomes higher, such as to 480 kHz or 960 kHz. In some embodiments, a UE may decode a PDCCH before decoding received PDSCH data. This may occur because the PDCCH data indicates whether the data from a PDSCH is intended for that particular UE and the time/frequency resources allocated for the PDSCH if any. While at lower SCS frequencies, the PDCCH decoding time may be not that significant, as the SCS frequencies increase, the PDCCH decoding time may impact the PDSCH processing time more significantly. In particular, if the UE receives PDSCH data while still decoding PDCCH data, the UE may buffer the PDSCH data and can only start PDSCH decoding after PDCCH decoding is done. To avoid this situation, PDCCH decoding time may be considered when scheduling PDSCH and/or PUSCH communications. This decoding time may be implemented using an adjustment factor.

At 705, a 5G Node B (gNB) may establish communication with a user equipment (UE). This may occur in a manner similar to that described at 505 with reference to FIG. 5A. At 710, the gNB may receive, from the UE, an indication of UE decoding time used to decode physical downlink control channel (PDCCH) data. This reporting may be performed in a similar manner as described with respect to PDSCH data as described with reference to 510. For example, the gNB may receive the same PDSCH parameters described with reference to 510 to determine PDCCH decoding latency. The UE may similarly report this latency with the PDSCH processing capabilities. With this information, the gNB may identify an adjustment factor, such as adjustment factor $d_{1,1}$ 415 used to determined $T_{proc,1}$ 405 as described with reference to FIG. 4A. This adjustment factor may consider PDCCH decoding latency. This may be applicable for single-slot scheduling and/or multi-slot scheduling cases.

At 715, the gNB may calculate an adjustment factor based on the indication received from the UE. This may be adjustment factor $d_{1,1}$ 415 and may consider PDCCH decoding latency for both single-slot and/or multi-slot scheduling cases. In some embodiments, when single- or same-slot scheduling is used, PDCCH decoding time may or may not be considered in the adjustment factor. For example, optionally, the adjustment factor may be zero. In this case, the gNB may not provide an additional adjustment factor for PDCCH decoding. This may be determined if the PDSCH and/or PUSCH processing time is defined in a manner that already allots time for PDCCH decoding.

In some embodiments, the gNB may add a fixed adjustment factor to account for PDCCH decoding. For example, the fixed adjustment factor may be represented as X slots or Y symbols. This fixed adjustment factor may be used when PDSCH processing time is defined considering PDSCH decoding without additional margin available to be used for PDCCH decoding.

In some embodiments, to calculate the adjustment factor, the gNB may apply a variable adjustment factor. This variable adjustment factor may be expressed as an amount of symbols using the following equation:

d=x*(Nsym−i)+y in symbols if i<Nsym, otherwise d=y symbols

In this equation, "i" may be the duration of a PDSCH transmission in symbols. In some embodiments, "i" may be an index of the last symbol of a PDSCH in a slot. The "Nsym" may indicate the number of data symbols, which may be pre-defined. The "x" value may be a scaling factor. This scaling factor may depend on the PDCCH decoding time. In some embodiments, the scaling value may be less than or equal to one. To provide an example, some values may be Nsym=7, x=1, and y=0.

As the SCS frequency increases and the PDCCH decoding time may become longer, the PDCCH decoding may have a larger impact on $T_{Proc}$. In this case, larger values for Nsym and/or non-zero values for "y" may be applicable. For example, some values for the higher SCS may be Nsym=7 and y=7. In some embodiments, the adjustment factor defined in this manner may be used to cover the combined effect of PDCCH decoding latency and the non-front-loaded DMRS for PDSCH mapping Type A.

While the previous options may be used for same-slot scheduling, the gNB may also use similar techniques for cross-slot scheduling. For example, the gNB may similar not apply an additional adjustment factor in a cross-slot context when a PDSCH and/or PUSCH scheduling delay is sufficiently large to cover PDCCH decoding. In some embodiments, when this scheduling delay is not sufficient, a fixed or variable adjustment factor may be used as described above. In this case, the scheduling delay may be subtracted from the fixed or variable adjustment factor. In some embodiments, this subtraction may not change the adjustment factor due to other factors such as additional DMRS, or DMRS location for PDSCH mapping Type A.

The previous embodiments have described an adjustment factor for single-slot scheduling. In this case, the UE may monitor the PDCCH in every slot. Without this monitoring, there may be scheduling limitations because the UE would only be schedulable in certain slots. In addition to this single-slot scheduling, however, the gNB may use multi-slot scheduling. Multi-slot scheduling may aid in reducing UE power consumption. Under the multi-slot scheduling scheme, the UE may monitor the PDCCH in every N slots. For example, the N=4, the UE may monitor the PDCCH one every four slots. The UE may also be scheduled with up to 4 PDSCH transmission in 4 slots. An example of this multi-slot scheduling is depicted in FIG. 8.

Figure 8:
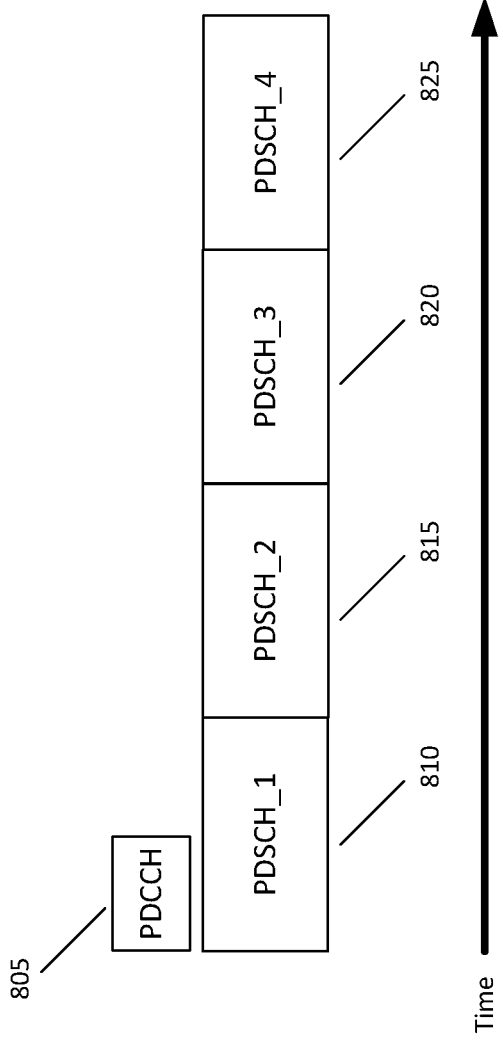
FIG. 8 illustrates a block diagram of PDCCH and PDSCH multi-slot scheduling, according to some embodiments.

FIG. 8 illustrates a block diagram 800 of PDCCH and PDSCH multi-slot scheduling, according to some embodiments. In this case, PDCCH 805 may be signaled once every N slots, such as every 4 slots. This multi-slot scheduling and PDCCH 805 signaling may providing signaling for four PDSCH transmissions: PDSCH_1 810, PDSCH_2 815, PDSCH_3 820, and PDSCH_4 825. In some embodiments, there may be gaps between two PDSCH depending on UE processing capability as previously discussed. These gaps may account for UE PDSCH processing time.

Based on this framework, with various N values, the gNB may perform multi-slot scheduling with different adjustment factors for PDCCH decoding. For example, similar to the single-slot case, the gNB may not apply an additional adjustment factor for PDCCH decoding. This may occur when PDSCH and/or PUSCH processing time is defined in a manner that allots time for and/or already covers PDCCH decoding. Similarly, this may occur when cross-slot scheduling is used with a scheduling delay that covers PDCCH decoding.

In some embodiments, the gNB may provide a fixed adjustment factor to account for PDCCH decoding. For example, the fixed adjustment factor may be represented as X slots or Y symbols. This fixed adjustment factor may be used when PDSCH processing time is defined considering PDSCH decoding without additional margin available for used for PDCCH decoding. The fixed adjustment factor may further be used when the UE has an efficient pipelining procedure and/or when PDCCH decoding would delay the decoding of the PDSCH transmissions controlled by the PDCCH.

In some embodiments, the gNB may apply an adjustment factor on a per-PDSCH basis. For example, a larger delay may be added to the first PDSCH, such as PDSCH_1 810. A smaller delay and/or no delay may be added to the later PDSCH, such as PDSCH_2 815, PDSCH_3 820, and/or PDSCH_4 825. The determination of the adjustment factor may occur in a manner similar to that described with reference to single-slot scheduling. To provide an example, if PDCCH decoding takes 2 slots (or 28 symbols), the PDSCH processing time for PDSCH_1 810, PDSCH_2 815, PDSCH_3 820, and PDSCH_4 825 may be (N1+28), (N1+14), N1, and N1 symbols, respectively.

In some embodiments, the gNB may divide the scheduled PDSCHs into multiple groups. The gNB may then apply the same adjustment factor for the PDSCHs belonging to the same group. For example, the UE may include two parallel processing engines. The UE may process for PDSCH_1 810 and PDSCH_3 820 using the first processing engine while processing PDSCH_2 815 and PDSCH_4 825 using the second processing engine. In this case, the adjustment factor to PDSCH_1 810 and PDSCH_3 820 may be the same and may be (N1+X). Similarly, the adjustment factor to PDSCH_2 815 and PDSCH_4 825 may be the same and may be (N1+Y). These adjustment factors may be expressed as symbols.

While these adjustment factors may be implemented, these adjustment factors may not change the adjustment due to other factors such as additional DMRS or DMRS location for PDSCH mapping Type A.

As previously explained, to potentially accommodate PDCCH decoding time, the gNB may calculate an adjustment factor based on an indication received from the UE at 715. This adjustment factor may be applied for single-slot and/or multi-slot scheduling. In some embodiments, the adjustment factor may be zero. At 720, the gNB may add the adjustment factor to time previously allotted for PDSCH processing to generate an adjusted PDSCH processing timing. At 725, the gNB may schedule the timing between a PDSCH transmission to a HARQ-ACK to be at least the adjusted PDSCH processing timing.

Figure 9:
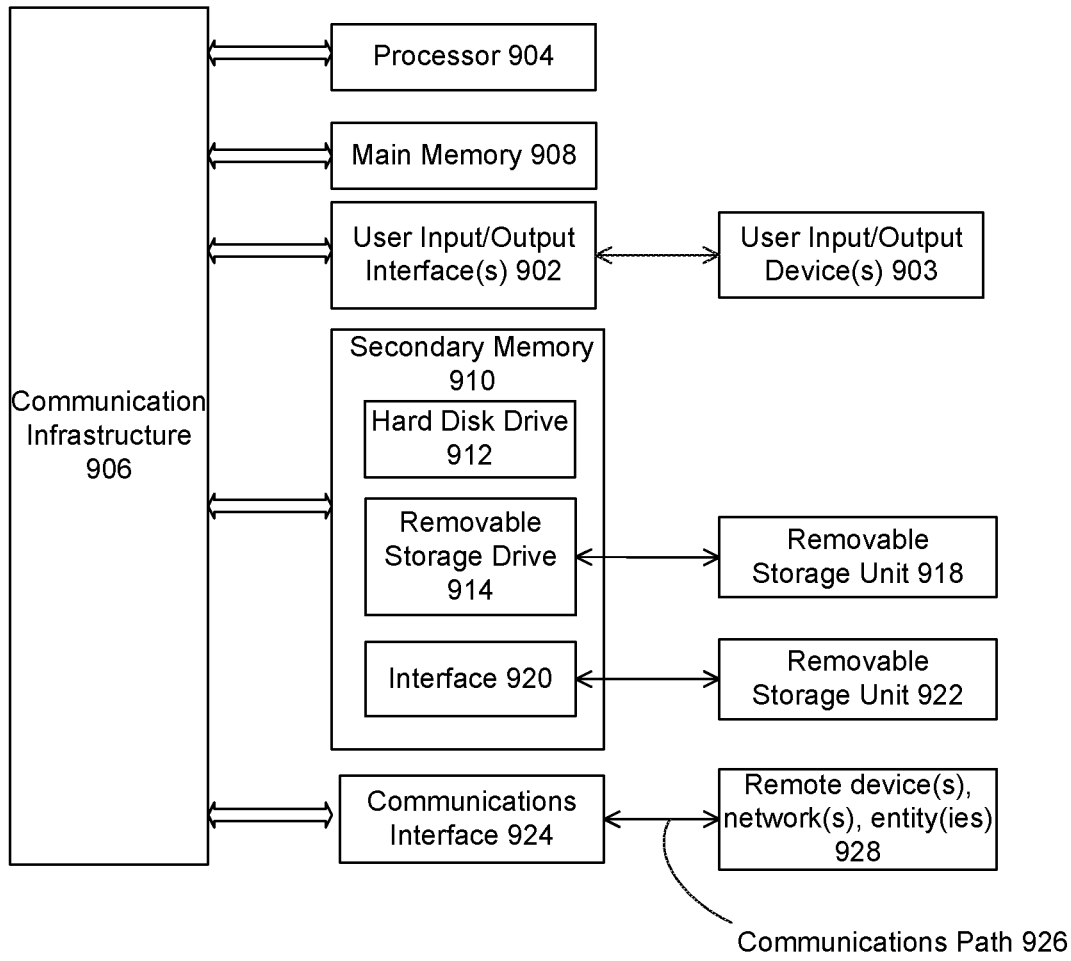
FIG. 9 depicts an example computer system useful for implementing various embodiments.

FIG. 9 depicts an example computer system useful for implementing various embodiments. Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 1000 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions: local or on-premises software ("on-premise" cloud-based solutions): "as a service" models (e.g., content as a service (CaaS), digital content as a service (DCaaS), software as a service (Saas), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA): whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A wireless communication apparatus, comprising:
a transceiver; and
at least one processor coupled to the transceiver, wherein the at least one processor is configured to:
establish communication with a user equipment (UE);
receive, from the UE, an indication of UE processing capabilities indicating data processing times for physical data channel communications, wherein the data processing times include a physical downlink shared channel (PDSCH) processing time, a physical downlink control channel (PDCCH) decoding time, a physical uplink shared channel (PUSCH) preparation time, and a channel state information (CSI) computation time;

calculate a first time delay based on the PDSCH processing time in the indication received from the UE and an adjustment factor, wherein the adjustment factor is based on the PDCCH decoding time in the indication received from the UE;

calculate a second time delay based on the PUSCH preparation time and the CSI computation time in the indication received from the UE;

schedule a first PDSCH transmission in a first downlink (DL) slot and a second PDSCH transmission in a second DL slot, wherein the second DL slot is separated from the first DL slot by at least the first time delay; and schedule a first PUSCH transmission in a first uplink (UL) slot and a second PUSCH transmission in a second UL slot, wherein the second UL slot is separated from the first UL slot by at least the second time delay.

2. The wireless communication apparatus of claim 1, wherein the at least one of the first PDSCH transmission or the second PDSCH transmission occurs using a subcarrier spacing (SCS) of 480 KHz or 960 kHz, and wherein at least one of the first PUSCH transmission or the second PUSCH transmission occurs using a subcarrier spacing (SCS) of 480 kHz or 960 KHz.

3. The wireless communication apparatus of claim 1, wherein the indication includes a number of physical data channel communications that the UE is able to process per number of slots.

4. The wireless communication apparatus of claim 1, wherein the indication includes a number of physical data channel communications that the UE is able to process in parallel.

5. The wireless communication apparatus of claim 1, wherein the indication includes a sum data rate that the UE is able to process within a time window.

6. The wireless communication apparatus of claim 1, wherein the indication includes a span pattern indicating a number of physical data channel communications that the UE is able to process within a span duration.

7. A method, comprising:

establishing, at a base station (BS), communication with a user equipment (UE);

receiving, from the UE, an indication of UE processing capabilities for physical data channel communications, wherein the UE processing capabilities include a physical downlink shared channel (PDSCH) processing time, a physical downlink control channel (PDCCH) decoding time, a physical uplink shared channel (PUSCH) preparation time, and a channel state information (CSI) computation time;

calculating, at the BS, a first time delay based on the PDSCH processing time in the indication received from the UE and an adjustment factor, wherein the adjustment factor is based on the PDCCH decoding time in the indication received from the UE;

calculating, at the BS, a second time delay based on the PUSCH preparation time and the CSI computation time in the indication received from the UE;

scheduling, at the BS, a first PDSCH transmission in a first downlink (DL) slot and a second PDSCH transmission in a second DL slot, wherein the second DL slot is separated from the first DL slot by at least the first time delay; and scheduling, at the BS, a first PUSCH transmission in a first uplink (UL) slot and a second PUSCH transmission in a second UL slot, wherein the second UL slot is separated from the first UL slot by at least the second time delay.

8. The method of claim 7, wherein the indication indicates that the UE does not support same-slot scheduling and supports cross-slot scheduling and wherein the PDSCH transmissions are scheduled using cross-slot scheduling.

9. The method of claim 7, wherein the indication indicates that the UE does not support same-slot scheduling and supports cross-slot scheduling and wherein the method further comprises:

scheduling, at the BS, the PUSCH transmissions with the UE using cross-slot scheduling.

10. The method of claim 7, wherein the PDSCH transmissions occur using a subcarrier spacing (SCS) of 480 kHz or 960 kHz, and wherein the PUSCH transmissions occur using a subcarrier spacing (SCS) of 480 KHz or 960 KHz.

11. The method of claim 7, wherein the PUSCH transmissions occur using a subcarrier spacing (SCS) of 480 kHz or 960 KHz.

12. The method of claim 7, wherein the indication includes a number of physical data channel communications that the UE is able to process per number of slots.

13. The method of claim 7, wherein the indication includes a number of physical data channel communications that the UE is able to process in parallel.

14. The method of claim 7, wherein the indication includes a sum data rate that the UE is able to process within a time window.

15. The method of claim 7, wherein the indication includes a span pattern indicating a number of physical data channel communications that the UE is able to process within a span duration.

16. A non-transitory computer-readable medium (CRM) having instructions that, when executed by one or more processors of a base station (BS), cause the BS to perform operations, the operations comprising:

establishing communication with a user equipment (UE);

receiving, from the UE, an indication of UE processing capabilities for physical data channel communications, wherein the UE processing capabilities include a physical downlink shared channel (PDSCH) processing time, a physical downlink control channel (PDCCH) decoding time, a physical uplink shared channel (PUSCH) preparation time, and a channel state information (CSI) computation time;

calculating a first time delay based on the PDSCH processing time in the indication received from the UE and an adjustment factor, wherein the adjustment factor is based on the PDCCH decoding time in the indication received from the UE;

calculating a second time delay based on the PUSCH preparation time and the CSI computation time in the indication received from the UE;

scheduling a first PDSCH transmission in a first downlink (DL) slot and a second PDSCH transmission in a second DL slot, wherein the second DL slot is separated from the first DL slot by at least the first time delay; and scheduling a first PUSCH transmission in a first uplink (UL) slot and a second PUSCH transmission in a second UL slot, wherein the second UL slot is separated from the first UL slot by at least the second time delay.

17. The non-transitory CRM of claim 16, wherein the indication indicates that the UE does not support same-slot scheduling and supports cross-slot scheduling and wherein the PDSCH transmissions are scheduled using cross-slot scheduling.

* * * * *